(12) United States Patent
Madlener et al.

(10) Patent No.: US 7,640,675 B2
(45) Date of Patent: Jan. 5, 2010

(54) METHOD FOR MEASURING TOOLS WITH A MEASURING DEVICE, AND MEASURING APPARATUS WITH A MEASURING DEVICE FOR MEASURING TOOLS

(75) Inventors: Wolfgang Madlener, Ravensburg (DE); Wilfried Veil, Ravensburg (DE)

(73) Assignee: M&H Inprocess Messtechnik GmbH, Waldburg (DE)

( * ) Notice: Subject to any disclaimer, the term of this patent is extended or adjusted under 35 U.S.C. 154(b) by 141 days.

(21) Appl. No.: 11/839,801

(22) Filed: Aug. 16, 2007

(65) Prior Publication Data
US 2008/0047155 A1 Feb. 28, 2008

(30) Foreign Application Priority Data
Aug. 22, 2006 (DE) .................. 10 2006 039 258

(51) Int. Cl.
*B23Q 17/22* (2006.01)
*G01B 21/00* (2006.01)
(52) U.S. Cl. .......................................... 33/503; 33/502
(58) Field of Classification Search ................ 33/502, 33/503, 504; 73/1.79, 1.81
See application file for complete search history.

(56) References Cited

U.S. PATENT DOCUMENTS 4,581,808 A 4/1986 Lawson et al.
5,150,529 A * 9/1992 Collingwood ................. 33/503
5,996,239 A * 12/1999 Ohnheiser ..................... 33/503
6,430,828 B1 * 8/2002 Ulbrich ......................... 33/503
6,519,860 B1 * 2/2003 Bieg et al. ..................... 33/503
2003/0059100 A1 * 3/2003 Fleming et al. ............. 382/141

FOREIGN PATENT DOCUMENTS

| DE | 195 28 376 A1 | 2/1997 |
| DE | 297 20 584 U1 | 10/1998 |
| DE | 198 51 411 A1 | 5/2000 |
| DE | 102 39 694 A1 | 3/2004 |
| JP | 04053653 A * | 2/1992 |
| WO | 2005/085753 A1 | 9/2005 |
| WO | WO 2008146506 A1 * | 12/2008 |

* cited by examiner

*Primary Examiner*—R. A. Smith
(74) *Attorney, Agent, or Firm*—Burr & Brown

(57) ABSTRACT

A method is proposed for measuring tools on a machine tool with a measuring device, wherein by means of a movement of a spindle of the machine tool the measuring device is temporarily positioned at a measuring point on the machine tool in order to carry out one or more measurements, the measuring point differing from a spindle mount. Furthermore, a measuring apparatus is proposed which is embodied in such a way that the measuring device can be positioned at a measuring point on the machine tool for a measuring operation by means of a spindle movement of a machine tool, said measuring point differing from a spindle mount.

23 Claims, 6 Drawing Sheets

METHOD FOR MEASURING TOOLS WITH A MEASURING DEVICE, AND MEASURING APPARATUS WITH A MEASURING DEVICE FOR MEASURING TOOLS

This application claims the benefit under 35 USC §119(a)-(d) of German Application No. 10 2006 039 258.2, filed Aug. 22, 2006, the entirety of which is incorporated herein by reference.

FIELD OF THE INVENTION

The invention relates to a method for measuring tools on a machine tool with a measuring device, and to a measuring apparatus with a measuring device for measuring tools.

BACKGROUND OF THE INVENTION

Methods which are designated in the introduction and measuring apparatuses are already known in various embodiments from the prior art.

In one embodiment, a tool measuring device is attached to a table of a machine tool in a position in which tools which are arranged in a spindle of the machine tool can reach the measuring device to be measured by it.

Before a measurement operation, the tool measuring device is standardized. To do this, a standardization tool whose geometry is known is used. The standardization tool approaches a sensor of the tool measuring device in a rotating or stationary fashion until the latter outputs a signal to a machine tool controller. The signal is used by a machine tool controller to store the position of the axle.

Tools to be measured are moved to the tool measuring device in the same ways as the standardization tool. From the difference between the axle values and the axle values of the standardization it is possible to calculate the geometry of the tool. There are various possible ways of transmitting signals from the tool measuring device to the tool machine controller. For example, the signal transmission is carried out with a cable. It is also known to transmit coded infrared signals to a receiver device which is connected to the machine tool controller by means of a cable. Instead of encoded infrared light signals it is also possible to use encoded radio signals.

The described procedure has a series of disadvantages. The tool measuring device is located in a fixed location on the machine tool. If it is the machine table, which normally is appropriate, the clamping surface for the workpiece is restricted.

In particular, tool measuring devices which are mounted on a machine table are at risk of collision. Any collision can result in damage.

Furthermore, a tool measuring device on a machine table is subjected to soiling by the processing of a workpiece, which runs off onto the machine table.

SUMMARY OF THE INVENTION

The invention is based on the object of making available a measuring method and a measuring device of the type designated in the introduction, with which a method and a device with the disclosed disadvantages can be reduced or entirely avoided.

The invention is firstly based on a method for measuring tools on a machine tool with a measuring device. A first essential aspect of the invention is by means of a movement of a spindle of the machine tool, the measuring device is temporarily positioned at a measuring point on the machine tool in order to carry out one or more measurements, the measuring point differing from a spindle mount. As a result of this procedure, in the best case a measuring device is located, for example, on a tool table, only for as long as is necessary to carry out measurements. In the rest of the time, the space, in particular on a machine table, can then be used without restrictions for processing operations. The essential factor here is that the measuring device is moved by means of the spindle movements so that no further additional mechanical positioning units are necessary.

The measuring device is preferably removed from the measuring point on the machine tool again after the measurement or measurements has/have been concluded. As a result, the measuring device can be reliably protected against soiling and damage as a result of processing operations.

However, it is not absolutely necessary to remove the measuring device after measurements have been terminated. It already provides advantages if the measuring device is removed after certain processing cycles, for example before a new workpiece is set up. If fine processing operations are carried out on a workpiece, for example a surface is smoothed, it may be in fact advantageous that a measuring device is available during the fine processing operation in order to be able to carry out tool measurements continuously. Only in this way is it possible to produce processing surfaces with comparatively very good quality. During such processing operations a measuring device is additionally subject to less soiling than during coarse processing.

Furthermore it is preferred if, after a measurement has been terminated, the measuring device is moved from the measuring point to a parking station. The parking station may be a conventional tool magazine. However, the measuring device can also be stored in a docking station with, for example, a power supply which is configured for charging accumulators in the measuring device.

In a further particularly preferred configuration of the invention, the measuring device is mounted with a standardization normal for positioning together on a measuring point. The mounting can be carried out, for example, from a tool magazine which can be reached by the spindle.

After positioning the measuring device at a measuring point, the standardization normal is advantageously disconnected from the measuring device.

It is thus possible to use the standardization normal, which preferably remains on the tool spindle, to carry out standardization of the measuring device at the measuring point before a measurement is carried out.

Moreover it is preferred if, after the standardization has been carried out, the standardization normal is moved to a parking position. After the standardization normal has been stored, the tool spindle can be used to mount a tool which can then be measured with the standardized measuring device. For example the length of the tool is determined.

In a further preferred embodiment of the invention, before the removal of the measuring device the measuring device is connected to the standardization normal. Both the standardization normal and the measuring device can then be moved together into a parking position, docking station or the like.

Furthermore, the invention is based at a measuring apparatus with a measuring device for measuring tools whose essential aspect is that the measuring device is embodied in such a way that the measuring device can be positioned at a measuring point on the machine tool for a measuring operation by means of a spindle movement of a machine tool, said measuring point differing from a spindle mount. It is thus possible to arrange the measuring device only temporarily at a measuring point by using already existing positioning possibilities.

The measuring device can be embodied as a contact-forming measuring device. For example it comprises a measuring probe. A contactless measuring device based on an optical system is also conceivable. For this purpose, a laser system or a system can be used which accesses a video chip or CCD chip.

In order to be able to perform effective standardization of a measuring device which has "just" been positioned on a machine tool, it is also proposed that a standardization normal be provided which is connected to the measuring device in a releasable connection.

After the measuring device has been positioned on a machine tool, the standardization normal is preferably disconnected from the measuring device. To do this it is advantageous if a release mechanism, which can preferably be triggered by the machine controller, is provided on the measuring device and/or standardization normal.

In a further preferred embodiment of the invention, the measuring device is at least partially arranged in a standardization normal for a positioning process on a machine tool. For this purpose, the standardization normal can be embodied as at least a partially hollow cylinder which surrounds the measuring device.

Means are preferably provided in order to be able to connect the standardization normal to the measuring device again.

In order to attach the measuring device to a machine tool it is furthermore advantageous if the measuring device has an adaptor device. For example, a bolt for a snap-action device is provided which is mounted on a tool table and into which the measuring device can snap by means of the bolt. However, a simple magnet foot or merely a standing surface is also conceivable for installing the measuring device on a corresponding surface, for example a machine table on a machine tool. This is because the measuring device's own weight can already be sufficient to be able to perform measurements reliably without further securing means.

In order to hold the measuring device, in particular together with the calibration normal, in a parking position it is advantageous if the measuring apparatus is configured for accommodation in a conventional tool magazine.

For this purpose, the measuring apparatus should have corresponding adaptor devices for a tool spindle. These devices are preferably formed on the calibration normal. The measuring apparatus preferably has a tool mount, for example a conical mount for a tool spindle.

In order to carry out the measurements, it is not necessary for the measuring device which usually operates in a cableless fashion using accumulators to be continuously in operation. In this context, it is preferred if the measuring device is embodied in such a way that its activation occurs as a result of the disconnection from the standardization normal. The activation can also take place as a result of the positioning process on the machine tool.

It is also conceivable for the measuring device to be activated as a result of sensing with a standardization normal.

Activation and/or deactivation can also be carried out by means of infrared signals or radio signals.

BRIEF DESCRIPTION OF THE DRAWINGS

An exemplary embodiment of the invention is illustrated in the drawings and will be explained below in more detail with further advantages and details. In the drawings.

DETAILED DESCRIPTION OF THE INVENTION

Figure 1:
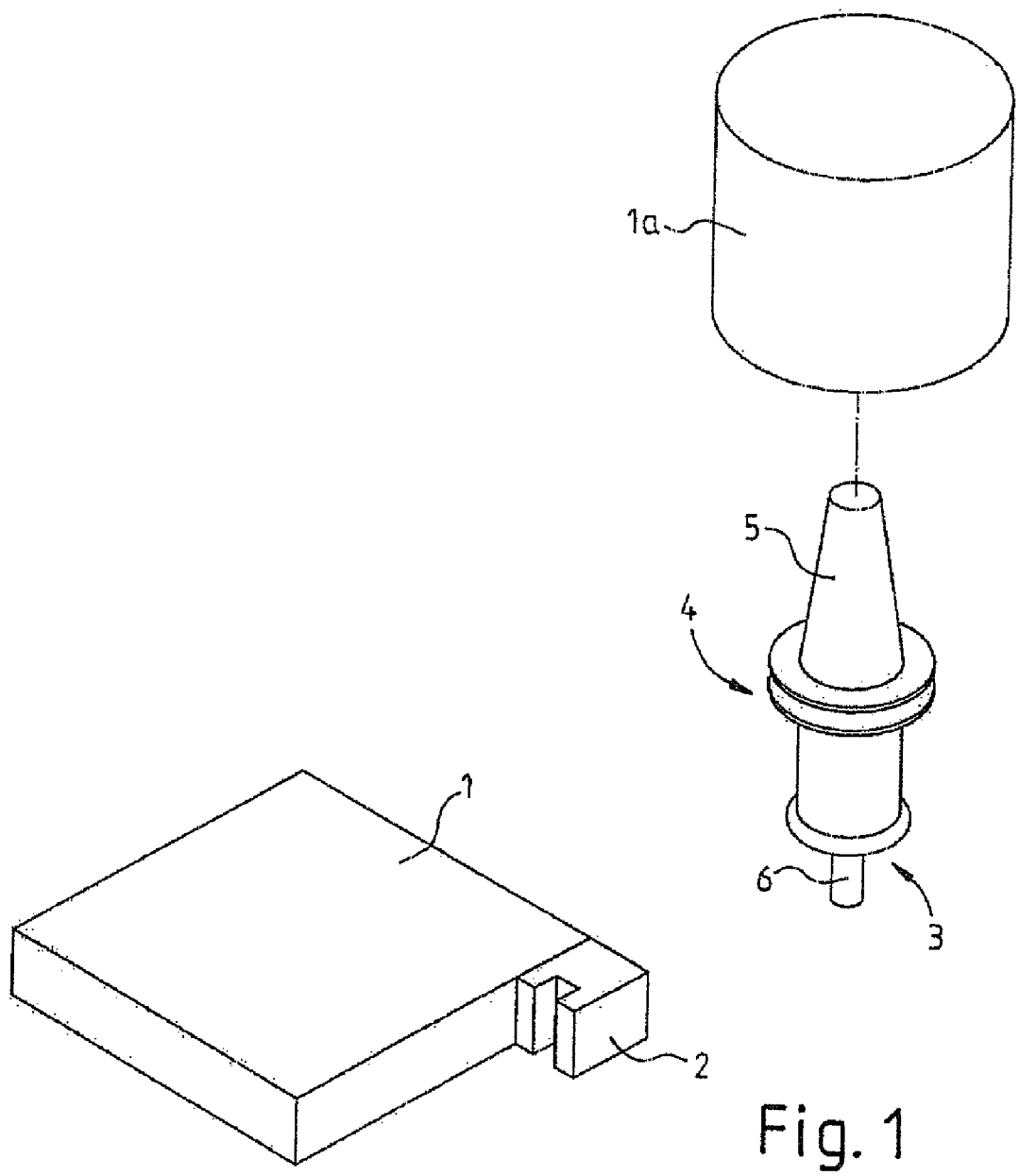
FIGS. 1 to 6 show instantaneous recordings, each in perspective illustration, of the positioning of a measuring device as part of a measuring apparatus and instantaneous recordings of a standardization operation and measuring operation.

FIG. 1 shows a machine table 1 of a machine tool with a spindle mount 1a (otherwise not illustrated). The machine table 1 has a snap-action device 2 for a measuring device 3 (see in particular FIG. 1).

The measuring device 3 is part of a measuring apparatus 4 with a conical stem 5, by means of which the measuring apparatus 4 can be picked up by the spindle mount 1a of the machine tool and moved.

Figure 2:
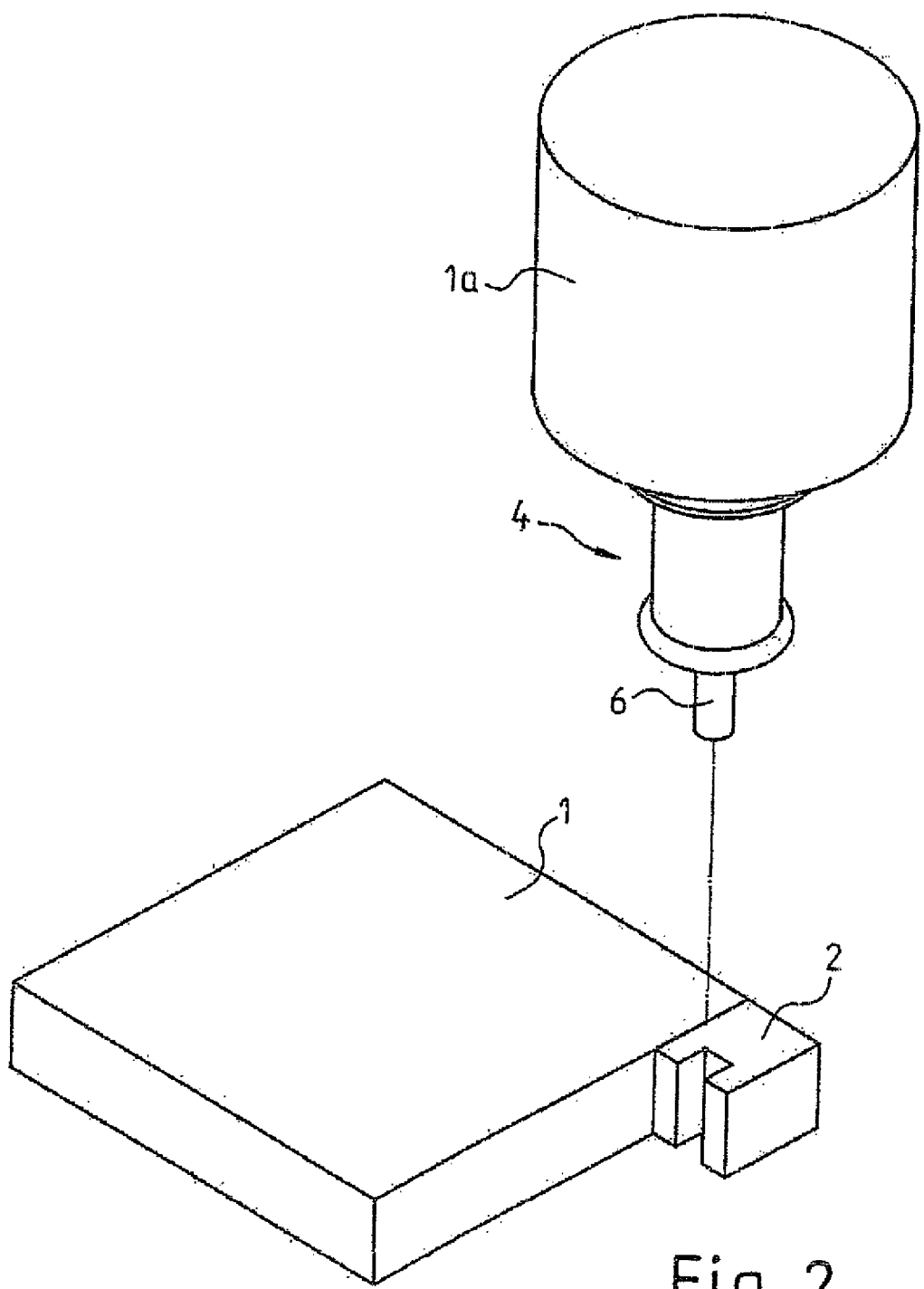

FIG. 1 illustrates the state in which the spindle mount 1a is in the process of picking up the measuring apparatus 4 via the conical stem 5 and moving the measuring apparatus 4 to the snap-action device 2 by means of the displacement and positioning possibilities of the machine tool. A somewhat advanced state is shown in FIG. 2.

Figure 3:
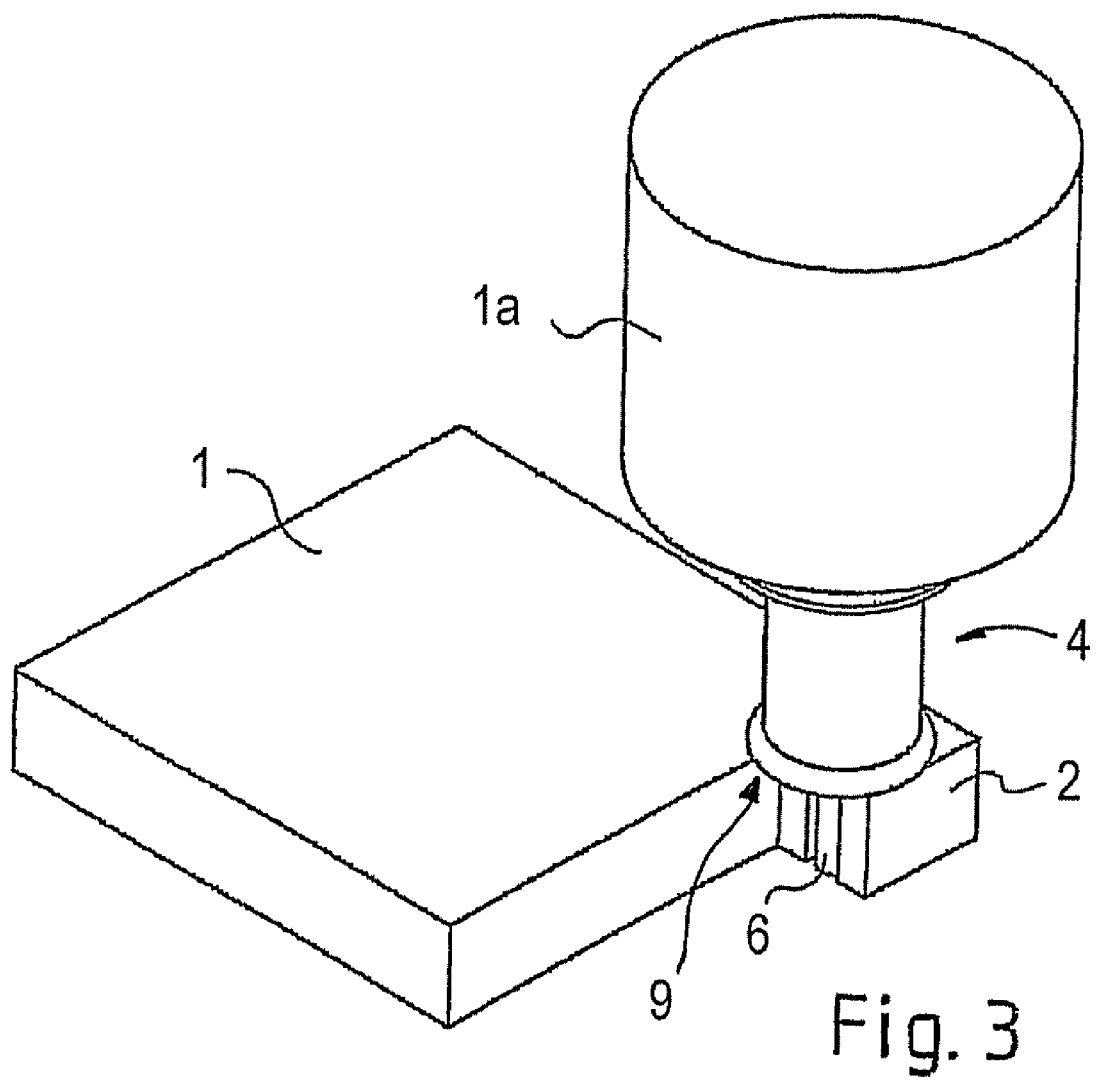

In FIG. 3, the measuring apparatus 4 has been snapped into the snap-action device 2 by means of a pin element 6 and a standing surface 9 rests on the machine table 1.

Figure 4:
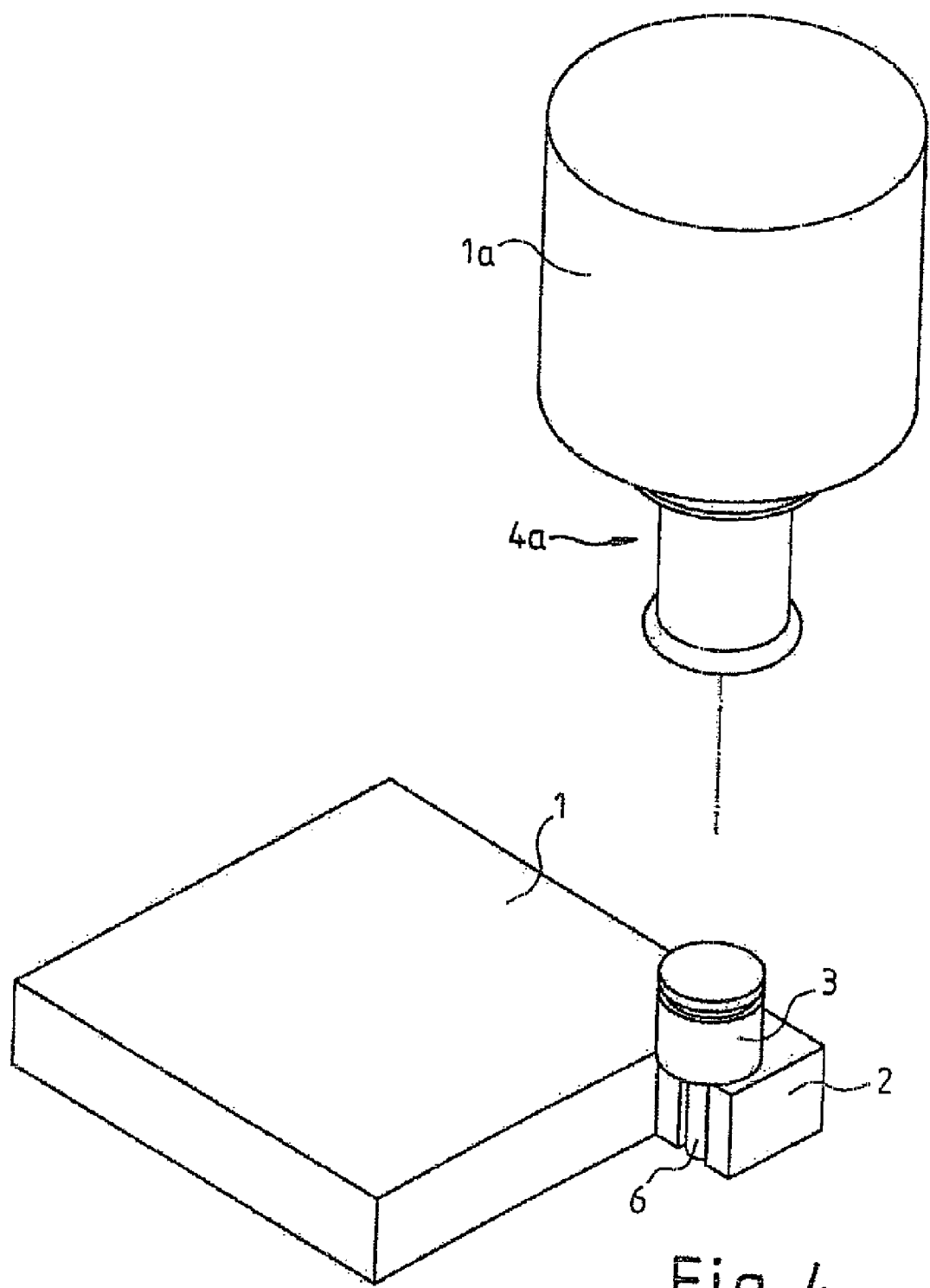

The measuring device 3 is then disconnected from the rest of the measuring apparatus 4 so that the measuring device 3 remains in the snap-action device 2. The pin element 6 is correspondingly arranged on the measuring device 3 (see FIG. 4).

The disconnection can be carried out by means of a release mechanism triggered by a machine controller.

The remaining measuring apparatus 4a advantageously comprises a standardization normal 7 which, as was previously the case for the entire measuring device 4, can be moved by means of the spindle of the machine tool.

Figure 5:
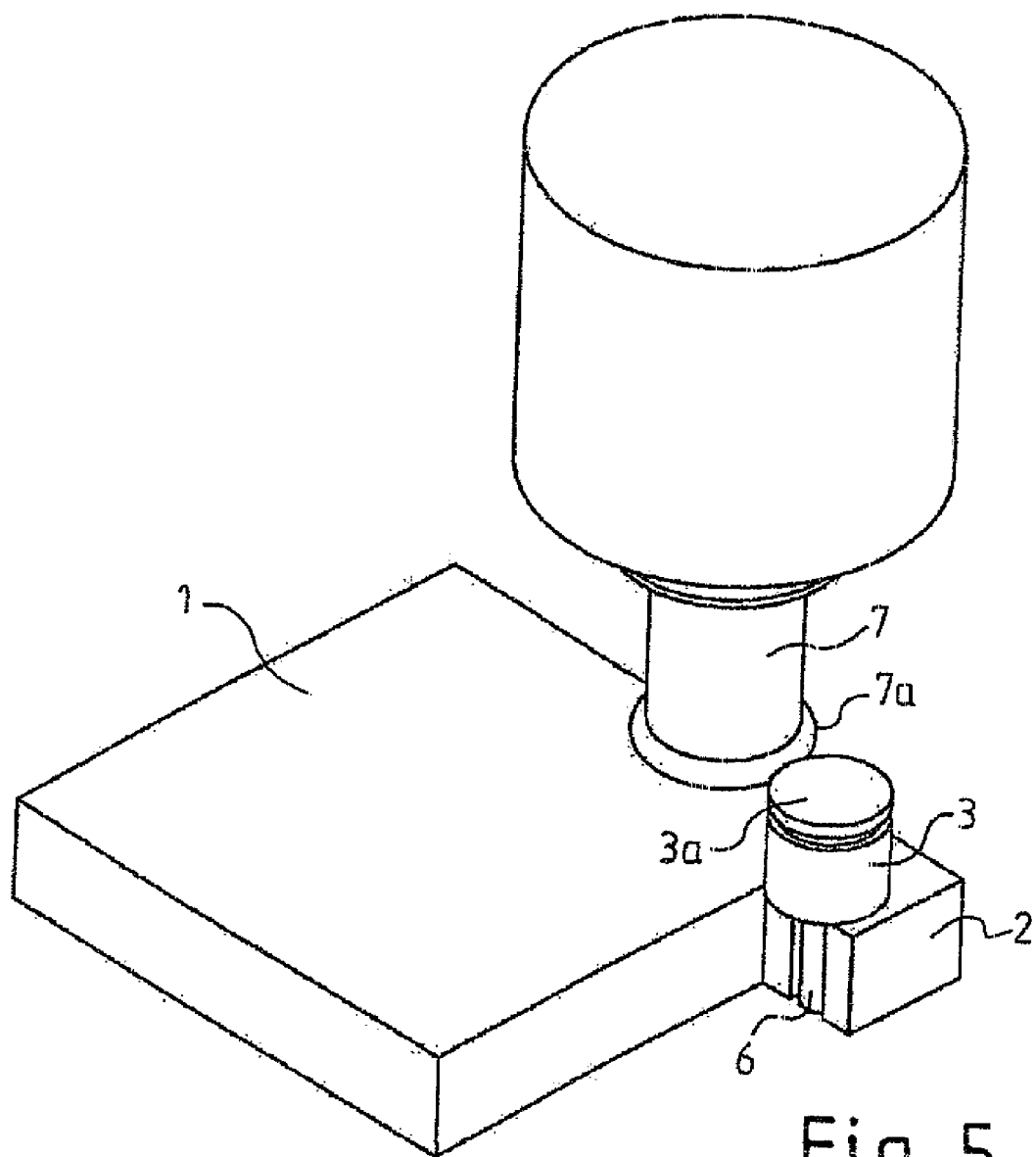

In the present case, the standardization normal 7 is embodied as a hollow cylinder with a standardization bead 7a and the measuring device 3 can be placed in an active state by the sensing done with the standardization normal 7 (see FIG. 5).

The geometry of the standardization normal 7 and the position of the standardization normal 7 with respect to a positioning device for the machine tool 1a are preferably known.

Longitudinal standardization can thus be performed by probing with the standardization normal 7 on a probe 3a of the measuring device 3 in a parallel direction to the rotational axis of the spindle (see FIG. 5).

As soon as the standardization normal triggers a switching signal on the probe 3a, the machine controller records the corresponding coordinate value in the axial direction. On the basis of the recorded value and using the knowledge of the geometry and position of the standardization normal with respect to the spindle, a longitudinal position can then be determined on a tool.

Corresponding standardization can be performed for later determination of a radius of a tool by virtue of the fact that the standardization bead 7a of the standardization normal 7 is made to approach the probe 3a in a perpendicular direction with respect to the rotational axis of the spindle. The diameter of a tool can be determined in a subsequent measuring pass on the basis of the coordinate value recorded in this direction and the diameter of the standardization normal.

The advantage of the present embodiment lies in particular in the hollow cylindrical construction of the standardization normal 7 which can be fitted over the measuring device 3 in order to take it up and move it. As a result, not only a very compact design is provided if the calibration element and measuring device are not disconnected from one another but also protection is also provided for the measuring device which is reliably held within the calibration element.

Figure 6:
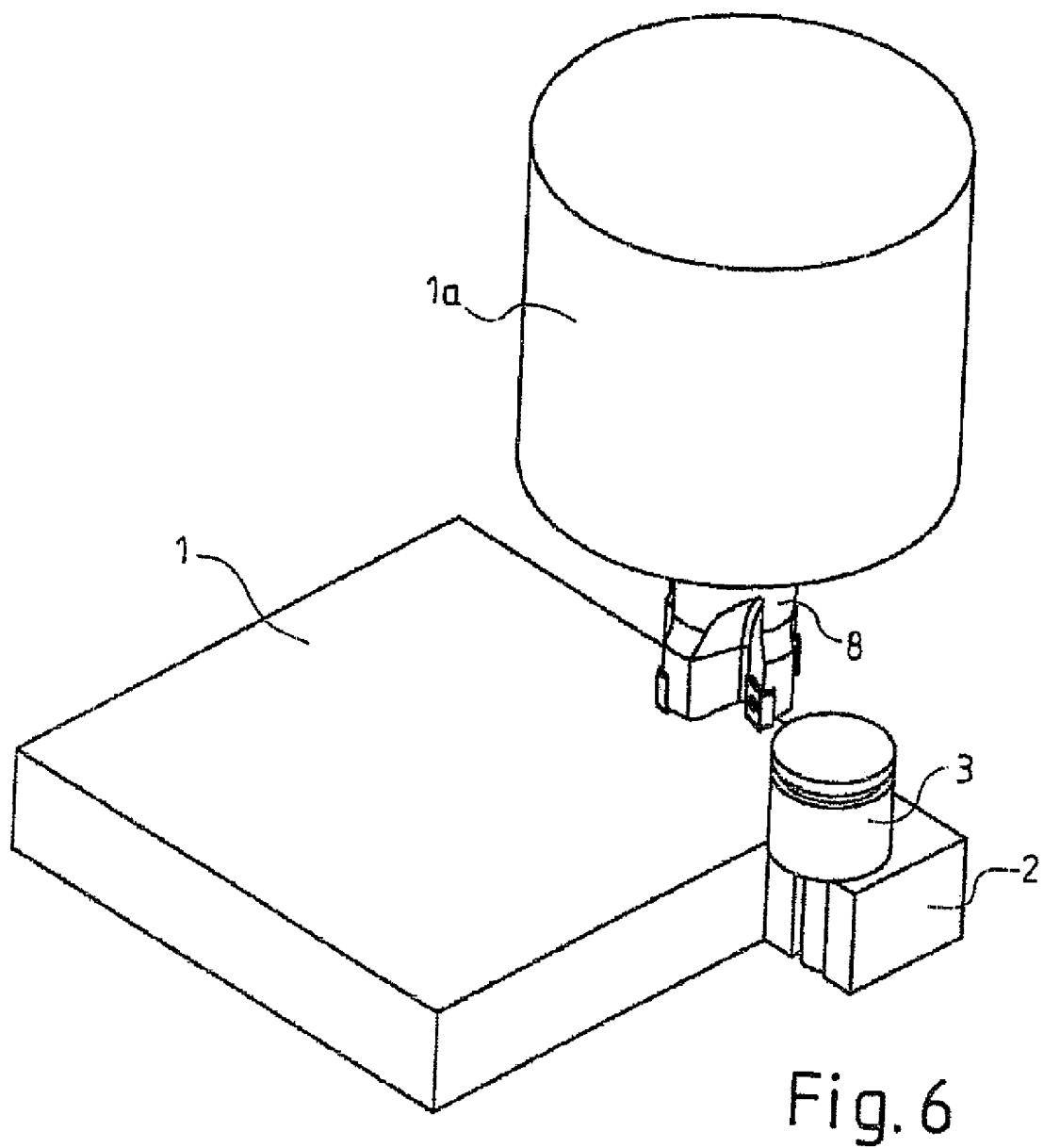

After a successful standardization process, a desired tool 8 which is held in the spindle 1a of the machine tool can be measured, for example with regard to a longitudinal position and its diameter (see FIG. 6).

After this operation, before a workpiece processing operation starts the measuring device can be removed again by picking it up with the calibration element and accommodating it in a parking position, for example, a suitable docking station (not illustrated).

For this purpose, the measured tool is preferably intermediately stored in tool magazine in order to pick it up again for processing operation after measurement has been carried out.

It is however also conceivable for the measuring device to remain for a specific processing cycle in the region of a workpiece which is to be processed, in order to be able to perform a measurement of the tool repeatedly.

The measuring device may then be removed from this area again in a later operation.

If appropriate, the measuring device may also remain positioned on the machine table 1 over a plurality of processing operations.

Standardization can basically be carried out it an automatic sequence by virtue of the proposed procedure.

Furthermore, the configuration of a clamping surface on a machine tool can also be optimized. Moreover, the soiling or the risk of damage to a machine device can be minimized by virtue of the fact that the measuring device is arranged on the tool table only for the measurement of tools and is then removed again.

LIST OF REFERENCE NUMERALS

1 Machine table
1a Spindle mount
2 Snap-action device
3 Measuring device
3a Probe
4 Measuring apparatus
4a Measuring apparatus without measuring device
5 Conical stem
6 Pin element
7 Standardization normal
7a Standardization bead
8 Tool
9 Standing surface

What is claimed:

1. A method for measuring tools on a machine tool with a measuring device, comprising picking up the measuring device with a spindle of the machine tool, and moving the spindle of the machine tool to temporarily attach the measuring device at a measuring point on the machine tool in order to carry out one or more measurements, wherein the measuring point differs from a spindle mount.

2. The method as claimed in claim 1, wherein the measuring device is removed from the measuring point on the machine tool after the measurement or measurements has/have been concluded.

3. The method as claimed in claim 2, wherein before the removal of the measuring device from the measuring point the measuring device is connected to a standardization normal.

4. The method as claimed in claim 1, wherein the measuring device is moved from the measuring point to a parking station after a measurement is terminated.

5. The method as claimed in claim 1, wherein the measuring device is mounted together with a standardization normal for positioning at the measuring point.

6. The method as claimed in claim 5, wherein the measuring device is removed from the standardization normal after the measuring device has been positioned at the measuring point.

7. The method as claimed in claim 5, wherein after standardization the standardization normal is moved into a parking position.

8. The method as claimed in claim 1, wherein the measuring device is standardized after the positioning of the measuring device at the measuring point.

9. A measuring apparatus having a measuring device for measuring tools, wherein the measuring device is picked up by a spindle of a machine tool, and the spindle of the machine tool moves to temporarily attach the measuring device at a measuring point on the machine tool for carrying out a measuring operation, wherein said measuring point differs from a spindle mount.

10. The measuring apparatus as claimed in claim 9, wherein the measuring device comprises a contact-forming measuring device.

11. The measuring apparatus as claimed in claim 9, wherein the measuring device comprises a contactless measuring device.

12. The measuring apparatus as claimed in claim 9, wherein a standardization normal is provided which is connected to the measuring device in a releasable connection.

13. The measuring apparatus as claimed in claim 12, wherein the measuring device can be disconnected from the standardization normal, in particular after the measuring device has been positioned at the measuring point on the machine tool.

14. The measuring apparatus as claimed in claim 12, wherein the measuring device is activated by disconnection from the standardization normal.

15. The measuring apparatus as claimed in claim 9, wherein, for a positioning process on the machine tool, the measuring device is arranged at least partially in a standardization normal.

16. The measuring apparatus as claimed in claim 15, wherein the standardization normal is hollow and cylindrical.

17. The measuring apparatus as claimed in claim 9, wherein the measuring device has an adaptor device for attachment to a machine tool.

18. The measuring apparatus as claimed in claim 9, wherein the measuring device has a standing surface for placing it on a tool table of a machine tool.

19. The measuring apparatus as claimed in claim 9, wherein the apparatus is configured for accommodation in a conventional tool magazine.

20. The measuring apparatus as claimed in claim 9, wherein the apparatus has a tool mount for a tool spindle.

21. The measuring apparatus as claimed in claim 9, wherein the measuring device is activated by positioning on the machine tool.

22. The measuring apparatus as claimed in claim 9, wherein the measuring device can be placed in an active state by sensing with a standardization normal.

23. The measuring apparatus as claimed in claim 9, wherein the measuring device can be activated and/or deactivated by means of infrared signals or radio signals.

* * * * *